(12) United States Patent
Schmidhuber

(10) Patent No.: US 6,286,717 B1
(45) Date of Patent: Sep. 11, 2001

(54) PRODUCT-DISCHARGING DEVICE FOR A PRODUCT SUPPLY SYSTEM

(75) Inventor: Josef Schmidhuber, Kraiburg (DE)

(73) Assignee: Multipond Wagetechnik GmbH, Waldkraiburg (DE)

( * ) Notice: Subject to any disclaimer, the term of this patent is extended or adjusted under 35 U.S.C. 154(b) by 0 days.

(21) Appl. No.: 09/423,216
(22) PCT Filed: Feb. 25, 1999
(86) PCT No.: PCT/EP99/01219
   § 371 Date: Nov. 2, 1999
   § 102(e) Date: Nov. 2, 1999
(87) PCT Pub. No.: WO99/45347
   PCT Pub. Date: Sep. 10, 1999

(30) Foreign Application Priority Data

Mar. 2, 1998 (DE) .............................. 198 08 474

(51) Int. Cl.$^7$ .......................... G01G 13/16; G01G 19/393
(52) U.S. Cl. .............. 222/77; 141/248; 177/65; 177/90; 177/91; 177/94; 177/102
(58) Field of Search .................. 177/65, 90, 91, 177/94–100, 102; 222/55, 58, 77; 141/248

(56) References Cited

U.S. PATENT DOCUMENTS

| | | | |
|---|---|---|---|
| 308,322 | * 11/1884 | Moyers | 177/99 |
| 346,852 | * 8/1886 | Koch | 177/65 |
| 616,863 | * 12/1898 | Richards | 177/65 |
| 657,178 | * 9/1900 | Nickerson | 177/100 |
| 819,881 | * 5/1906 | Hager | 177/95 |
| 1,881,859 | * 10/1932 | Mulendore | 177/98 |
| 4,616,722 | 10/1986 | Moran | 177/99 |
| 4,874,048 | 10/1989 | Kawanishi et al. | 177/25.18 |

FOREIGN PATENT DOCUMENTS

| | | |
|---|---|---|
| 428 543 | 7/1967 | (CH) . |
| 38 23 329 C2 | 11/1990 | (DE) . |
| 0 113 586 | 6/1988 | (EP) . |

* cited by examiner

Primary Examiner—J. Casimer Jacyna
(74) Attorney, Agent, or Firm—George W. Neuner; Dike, Bronstein, Roberts & Cushman

(57) ABSTRACT

A product supply apparatus for a weighing system (3) for supplying a weighed product quantity (4, 5) to a product receiving device (7) of a packaging machine (8) is formed to prevent spreading of the supplied product quantity when discharging from a collecting receptacle (11, 12) and falling through the product receiving device (7).

9 Claims, 2 Drawing Sheets

PRODUCT-DISCHARGING DEVICE FOR A PRODUCT SUPPLY SYSTEM

Figure 1:
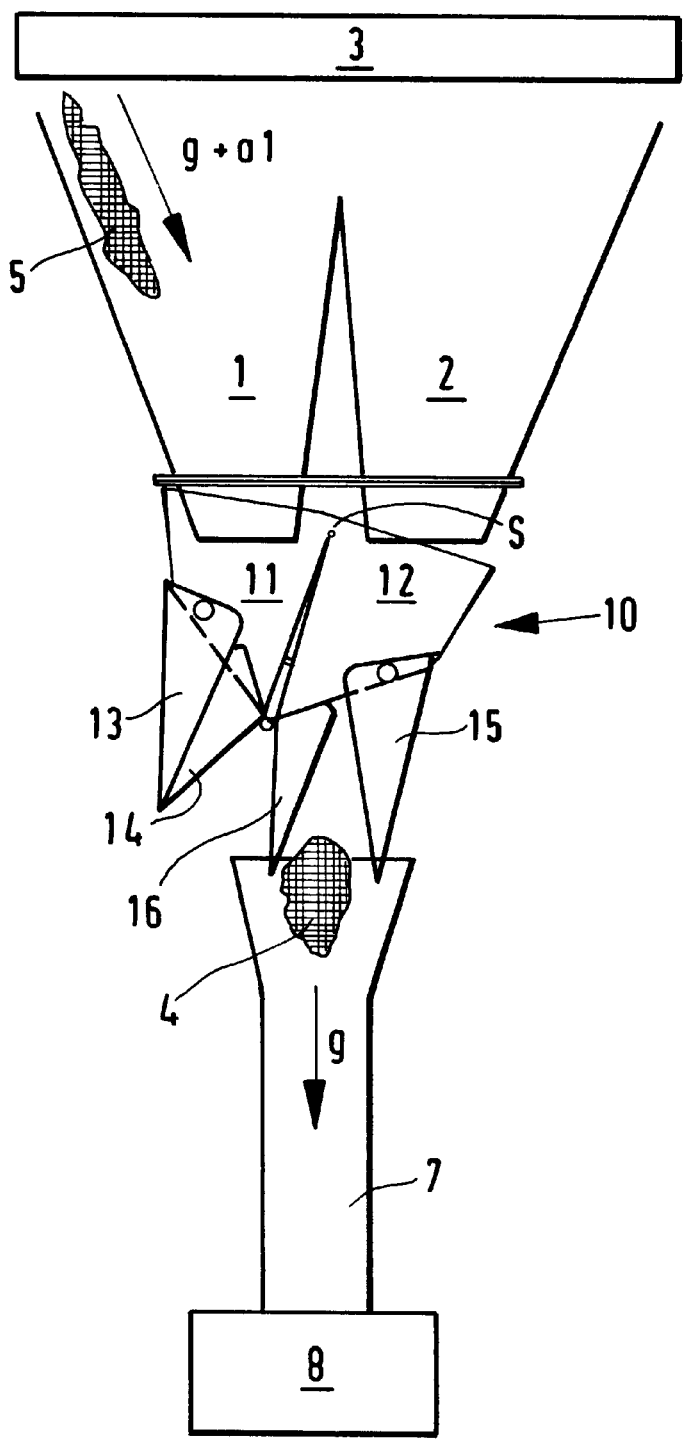

The present invention relates to a product supply apparatus for a product providing device such as a weighing system according to the preamble of claim 1.

When filling empty packages such as bags, deep drawn cups, boxes or the like, for example for producing ready-to-serve meals or the like, the operating speed of modern packaging machines is so high that it is hardly possible, in the short time available, to reliably supply defined product quantities obtained for example by weighing, counting, time-controlled metering or the like, to the packaging containers to be filled.

In order to provide the product quantities to be filled into the packaging containers a corresponding number of conventional filling balances or a combinatorial type weighing apparatus, for example, is used. In both cases weighed product quantities available in spacially separate weighing receptacles of the corresponding conventional balances or of the combinatorial weighing apparatus must be supplied to the feeding position of the packaging machine. Typically, this is obtained by means of product feeding devices in the form of chutes or collecting hoppers of suitable slope. The weighed product quantity discharged from the weighing receptacles is spreaded after falling onto the chute or onto the wall of the collecting hopper.

Document EP 0 113 586 B1 discloses a product supply apparatus for a product providing device, in this case for a weighing system in the form of a combinatorial weighing apparatus, according to the preamble of claim 1. In the product supply apparatus disclosed therein the two collecting receptacles are fixedly mounted above the feed opening of the product receiving device of the packaging machine. Each of the two collecting receptacles comprises two longitudinal walls, one of the two walls swinging relative to the other in direction of the center axis of the feed opening for opening the collecting receptacle for discharging a weighed product quantity into the feed opening of the packaging machine. In the closed state of the collecting receptacle the longitudinal walls define a downwardly tapering interior space. For emptying a collecting receptacle its swinging longitudinal wall is swung inwardly to a position above the center axis of the feed opening. The weighed product quantity available within the collecting receptacle is accelerated by gravitation. The discharged product quantity is further subject to an acceleration action transversely to the acceleration by gravity, effected by the sloping fixed longitudinal wall. Thus, the product quantity is spread apart already during the discharge from the collecting receptacle.

Owing to the large cross-section of the feed opening of the packaging machine it is further necessary to taper the opening cross-section of the product receiving device of the packaging machine for filling a packaging container having a smaller opening. This requires a further contact of the weighed product quantity with the wall of the product receiving device of the packaging machine and thereby causes a further spreading of the product quantity. But even in case that there is no taper of the opening cross-section of the product receiving device of the packaging machine the transverse acceleration forces the product quantity discharged from the collecting receptacle into contact with the wall of the product receiving device of the packaging machine and thereby spreads the product quantity.

However, this spreading of the product occurring when discharging the weighed product quantity from the collecting receptacle or by the contact of the product quantity with the product receiving device of the packaging machine, respectively, limits the maximum filling speed of the packaging machine.

Document CH 428 543 discloses a product supply apparatus for a product providing device comprising a first product feeding apparatus having a corresponding first collecting receptacle and a second product feeding apparatus having a corresponding second collecting receptacle, the collecting receptacles each having a closure at their bottom. The product supply apparatus supplies product quantities provided by the product providing device to a product receiving device consisting of a plurality of feed hoppers circulating on a circle below the product feeding devices. A collecting receptacle is opened at the time when one of the circulating feed hoppers is placed therebelow. The further circulating feed hopper is emptied at a time when the discharge opening of the feed opening, having a closure flap, is aligned with the opening of a packing to be filled. A product receiving device receiving corresponding quantities from several product feeding apparatus is not disclosed.

Document DE 38 23 329 C2 discloses a weighing receptacle with a double closure flap having a substantially pointed shape along its longitudinal axis.

It is the object of the invention to provide a product supply apparatus of the generic type which avoids spreading the product.

This object is achieved by a product supply apparatus according to claim 1.

Further developments of the invention are defined in the subclaims.

Figure 2:
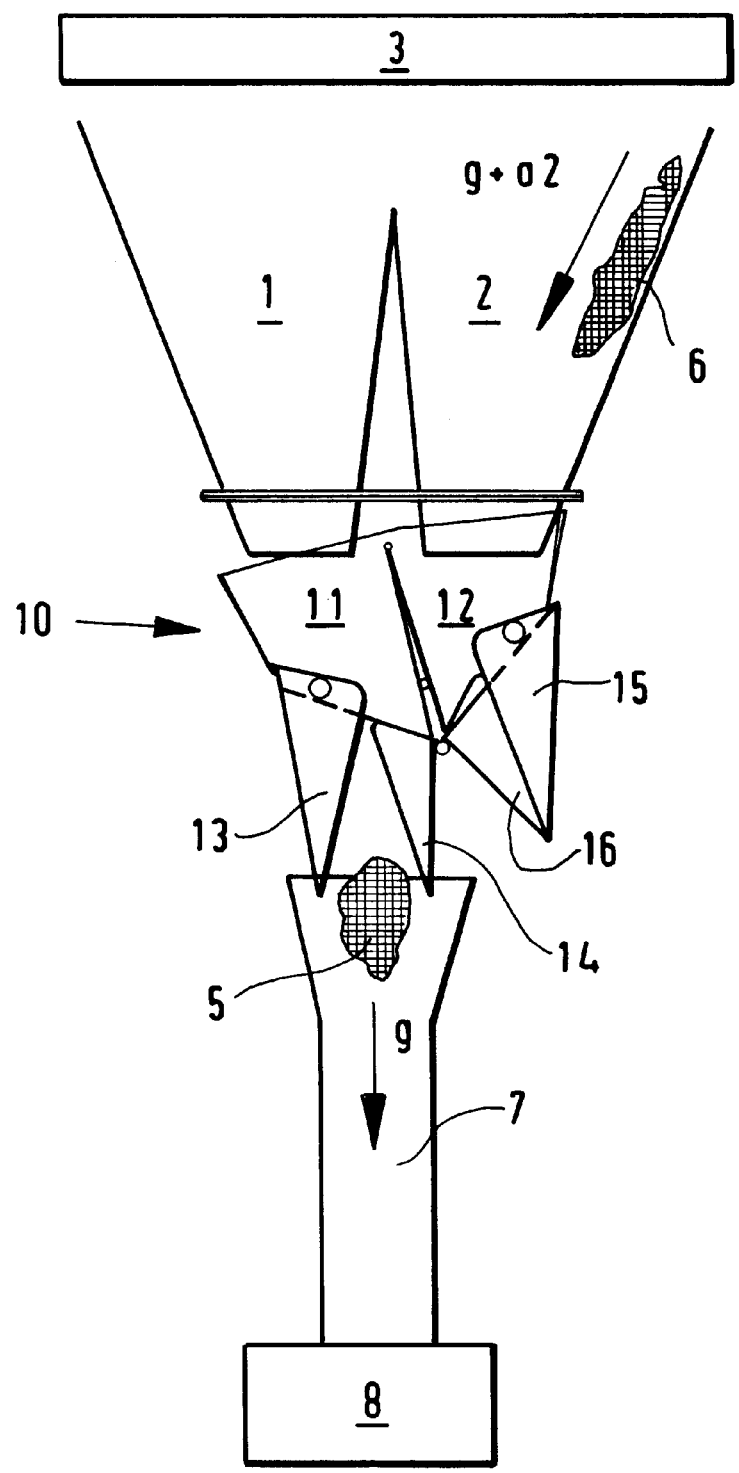

Further features and advantages will be apparent from the description of embodiments with reference to the figures. In the figures:

FIG. 1 shows a first embodiment of the invention with the collecting receptacle assembly being in a first position, and FIG. 2 the embodiment of FIG. 1 with the collecting receptacles assembly being in a second position.

A first embodiment of the product supply apparatus is shown in the FIG. 1 and 2. In both figures a weighing system 3, being an example of a product supply apparatus and formed for example as a combinatorial weighing apparatus or as a counting apparatus, metering apparatus or the like, and a packaging machine 8 are represented as boxes. When using, in the following description, the terms top, bottom, horizontal, vertical or the like it is referred to the corresponding positions in operation of the apparatus. The product supply apparatus according to the first embodiment comprises first and second product feeding apparatus 1, 2 each having a collecting hopper formed at their lower portion. The collecting hoppers 1, 2 each comprise bottom discharge openings arranged horizontally side by side with a spacing therebetween. A first collecting receptacle 11 is arranged below the discharge opening of the first collecting hopper 1 and a second collecting receptacle 12 is arranged below the discharge opening of the second collecting hopper 2.

As shown in the first embodiment the two collecting receptacles 11, 12 have a downwardly tapering interior space. Each collecting receptacle 11, 12 has a closure means provided at the lower portion thereof, each closure means being formed by two closure flaps 13, 14 and 15, 16, respectively. The closure flaps 13, 14 and 15, 16, respectively, define a respective interior space having a downwardly tapering shape. Specifically, in the first embodiment, the interior space is acutely pointing downwardly and approximately axisymmetric. The closure flaps 13, 14 and 15, 16, respectively, forming closure means are each pivotable relative to each other about a horizontal pivot axis by means of a not shown driving device for opening and closing the closure means. The driving device is designed to pivot or swing the closure flaps at high acceleration or speed. The closure flaps define, in an open state of the closure means, a respective opening crosssection having a predetermined round shape of a first diameter. For other embodiments, however, other tapering shapes are possible, such as inverted pyramids or cones or other shapes tapering downwardly along at least one horizontal dimension.

In the embodiment shown in the FIG. 1 and 2 the collecting receptacles 11, 12 form a collector assembly 10 which can be swiveled around a horizontal swivel axis S arranged centrally between both collecting receptacles and between the two discharge openings thereof from a first position to a second position and vice versa by a not shown actuating device. In the first position of the collector assembly 10 shown in FIG. 1 the second collecting receptacle 12 is positioned in a discharge position above a product receiving device 7 of the packaging machine 8. The product receiving device 7 is formed as a vertical fill tube having a predetermined round cross-section of a second diameter. In the second position of the collector assembly 10 shown in FIG. 2 the first collecting receptacle 11 is in a corresponding discharge position above the opening cross-section of the product receiving device 7. In the discharge position the closure means of the corresponding collecting receptacle 11, 12 is substantially centrally aligned with the opening cross-section of the product receiving device 7, i.e. the first and second diameter are substantially coaxial in vertical direction (i.e. in the direction of the gravitation g). In the first embodiment the collecting receptacles 11, 12 are integrated components of a collector assembly 10. However, the collecting receptacles may be formed as separate collecting receptacles which can be swung by corresponding actuating devices around respective swivel axises into corresponding discharge positions above the product receiving device 7 in an independent but coordinated manner.

The weighing system 3 supplies weighed product quantities 4, 5, 6 to the first or second product feeding apparatus 1, 2. The weighed product quantities 4, 5, 6 supplied by the weighing system consist of a quantity of individual objects such as grains of sugar crystals, candies, tomatoes or the like and glide, slide or roll along the wall of the corresponding collecting hopper 1, 2 into the first or second collecting receptacle 11, 12, respectively, by action of the gravitation g and an additional transverse acceleration a1 and a2, respectively, caused by the wall of the collecting hopper. This spreads the product quantity.

The weighed product quantities 4, 5, 6 supplied by the weighing system 3 are collected in the collecting receptacles 11, 12, respectively, having the closure means closed, whereby the product quantities spread by the walls of the collecting hopper recombine to a compact mass by the tapering interior space. The product quantity 4, 5, 6 collected in one of the collecting receptacles 11, 12 is determined such that the compact mass is in contact with the closure flaps 13, 14, 15, 16 but out of contact with the fixed walls of the collecting receptacles 11, 12.

The collecting receptacles 11, 12 are arranged so that a discharge opening of the corresponding collecting hopper 1, 2 is always positioned, in a direction of gravitation g, to be within the contour of the upper opening of the collecting receptacle, whereby the collecting receptacles can receive a weighed product quantity 4, 5, 6 supplied from the weighing system 3 in the discharge position of the collecting receptacles above the product receiving device 7 as well as in any other position. Depending on the required feed rate of the weighed product quantities into the packaging machine 8 a further weighed product quantity may already be supplied from the weighing system 3 to the collecting hopper 2 for example in the position of the second collecting receptacle 12 shown in FIG. 1, whereby this further product quantity arrives within the collecting receptacle 12, dependent on the falling or sliding speed in the collecting hopper 2, only after closing the closure means by pivoting the closure flaps 15, 16.

Reference is now made to FIG. 1 which clearly shows that the substantially central position of the closure means of the collecting receptacle 12 above the feed opening cross-section of the product receiving device 7 enables the weighed product quantity 4 to be supplied or discharged from the collecting receptacle 12 without subsequently contacting the wall of the product receiving device 7. This is substantially achieved by the central arrangement of the closure means of the collecting receptacle 12. By rapidly swinging the closure flaps 13, 14 and 15, 16, respectively, away from the axis of symmetry the discharged product quantity 4, 5 is subject to substantially no acceleration other than the gravitation. Moreover, the rapid swiveling movement of the closure flaps 13, 14 and 15, 16, respectively prevents any spreading of the product by sliding or gliding along the inner sides of the closure flaps. By preventing a transverse acceleration of the weighed product quantity 4 discharged from the collecting receptacle 12 the cross-section of the compacted mass of the weighed product quantity 4 discharged from the collecting receptacle 12, which in any case is smaller or equal to the opening cross-section of the opened closure means, can be brought into optimum match with the opening cross-section of the product receiving device 7. In the first embodiment the round opening cross-section of the opened closure means of the collecting receptacle has the corresponding first diameter which is slightly smaller than the second diameter of the round opening cross-section of the feed tube 7. Alternatively, the opening cross-section of the feed tube 7 may for example be rectangular and the opening cross-section of the closure means may be rectangular as well.

Spreading the product quantity and exerting a transverse acceleration when discharging the product quantity from the collecting receptacle is in principle prevented by the tapering shape of the interior space defined by the closure flaps and by the rapid opening swiveling movement of the closure flaps. If it is not desired, in a particular case, to use a tapering shape of the interior space of the collecting receptacles and of the interior space defined by the closure means, respectively, the same effect can be obtained by opening the closure flaps in such a manner that each point of the closure flaps is, at least at the start of the opening movement, subject to an acceleration>g in direction of the gravitation g, in other words by an extremely rapid opening pivoting movement.

It will be apparent from the above description of the first embodiment that the requirement of tapering the product feed device 7, i.e. the feed tube of the packaging machine 8, is avoided by moving the collecting receptacles to a corresponding central discharge position above the product receiving device 7. Moreover, a contact of the product with the wall of the product receiving device 7 is prevented by the fact that the product quantity discharged from the interior space defined by the closure flaps is not subject to any substantial acceleration other than the gravitation whereby the opening cross-section of the product receiving device 7 can be adapted to the discharge cross-section of the collecting receptacle in an optimum manner. Furthermore, since the product quantity is discharged as supplied through the product receiving device 7 to the packaging machine 8 as the compact mass provided in the interior space defined by the closure flaps, the fill speed of the packaging machine 8 can be further increased.

A further embodiment comprises not only two but three or more product feeding apparatus and corresponding collecting receptacles. The collecting receptacles are positioned in the corresponding sequence centrally above the opening cross-section of the product receiving device.

The timed sequence of movement of the collector assembly 10 or of the corresponding separate collecting receptacles, and the timing of opening and closing the collecting receptacles 11, 12 is controlled by a pneumatic or electromechanical drive in connection with suitable mechanic elements such as levers, joints, cam plates, stops and the like. Alternatively this control can be effected by several pneumatic or electromechanical drives having their sequential movements coordinated by a programmable control. The control of the drive(s) is suitable synchronized with the control of the product supply apparatus 3 and of the packaging machine 8.

According to the experience made by the applicant the inventive product supply apparatus allows the filling speed of the packaging machine and therefore the discharge rate of the product supply apparatus to be increased by up to 30% with respect to conventional arrangements.

What is claimed is:

1. A product supply apparatus for supplying a quantity of a product provided by a product providing device to a product receiving device having a feed opening of predetermined size, said product supply apparatus comprising first product feeding means having a first collecting receptacle with first closure means provided at the bottom of said first collecting receptacle for closing or opening said bottom of said first collecting receptacle, said product supply apparatus further comprising second product feeding means having a second collecting receptacle with second closure means provided at the bottom of said second collecting receptacle for closing or opening said bottom of said second collecting receptacle, and means for moving said first and second collecting receptacle, respectively, into a discharge position whereby said first and second closure means, respectively, is positioned substantially centrally above said feed opening.

2. The product feeding apparatus of claim 1, comprising a collector assembly including said first and second collecting receptacles, and means for moving said collector assembly from a first position wherein said first collecting receptacle is in its discharge position to a second position wherein said second collecting receptacle is in its discharge position, and vice versa.

3. The product supply apparatus of claim 1, wherein each product feeding means comprises a respective product supply opening and means for positioning a corresponding one of said collecting receptacles below said product supply opening for collecting said product quantity provided by said product providing device to the corresponding one of said product feeding means in any position of said collecting receptacle.

4. The product supply apparatus of claim 1, wherein said first and second closure means each comprise two closure flaps and means for pivoting said closure flaps relative to each other.

5. The product supply apparatus of claim 1, wherein said first and second collecting receptacles each have an interior shape formed to prevent any acceleration of the discharged product quantity transversely to gravity when opening the corresponding first or second closure means.

6. The product supply apparatus of claim 5, wherein the bottom portion of said interior space of each collecting receptacle is defined by the corresponding closure means formed to substantially taper in direction of gravity in closed state of said closure means.

7. The product supply apparatus of claim 5, wherein said interior space of each collecting receptacle is defined, at its bottom portion, by a corresponding one of said closure means which is formed as an acute point substantially along a longitudinal axis thereof, in closed state of said closure means.

8. The product supply apparatus of claim 1, wherein said first and second closure means each comprise, in open state, a free cross-section which is smaller than said predetermined size of said feed opening of said product receiving device.

9. The product supply apparatus of claim 1, wherein said product providing device comprises a weighing system.

* * * * *